(12) United States Patent
Pervaiz

(10) Patent No.: US 6,305,405 B1
(45) Date of Patent: Oct. 23, 2001

(54) VALVE FOR A TANK AND ESPECIALLY FOR A FLOW CONTROL ARRANGEMENT HAVING A PLURALITY OF FLUID STORAGE TANKS

(75) Inventor: Muhammad Pervaiz, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/407,576

(22) Filed: Sep. 28, 1999

(51) Int. Cl.[7] ................................ B67D 5/04; F16K 31/32; F16K 51/00
(52) U.S. Cl. .................. 137/255; 73/322.5; 137/395; 137/399; 137/447; 137/565.01; 222/67
(58) Field of Search ..................... 137/391, 398, 137/399, 447, 448, 267, 563, 565.01, 395, 255, 266, 565.35; 141/198; 73/322.5; 222/64, 66, 67

(56) References Cited

U.S. PATENT DOCUMENTS

| | | | |
|---|---|---|---|
| 1,775,860 | * | 9/1930 | La Bour ............................ 137/399 |
| 1,906,277 | * | 5/1933 | McGee ............................. 137/399 |
| 2,519,968 | * | 8/1950 | Jordan ............................. 137/266 |
| 2,535,094 | * | 12/1950 | Samiran ........................... 137/399 |
| 2,704,117 | * | 3/1955 | Samiran ........................... 137/414 |
| 2,730,126 | * | 1/1956 | Jensen ............................. 137/267 |
| 2,733,728 | * | 2/1956 | Sampselle ......................... 137/267 |
| 2,792,014 | * | 5/1957 | Granberg .......................... 137/267 |
| 2,843,145 | * | 7/1958 | Koehler et al. .................... 137/414 |
| 3,095,894 | * | 7/1963 | Jensen ............................. 137/267 |
| 3,203,444 | * | 8/1965 | Gravert ........................... 137/391 |
| 3,319,645 | * | 5/1967 | Mahoney et al. ................... 137/267 |
| 3,404,703 | * | 10/1968 | Marx .............................. 137/391 |

\* cited by examiner

Primary Examiner—George L. Walton
(74) Attorney, Agent, or Firm—Carl A. Rowold, Esq.; David G. Maire, Esq.; Beusse, Brownlee, Bowdoin & Wolter, PA

(57) ABSTRACT

A fluid flow control valve having a cam disposed near an opening of a fuel passage. The cam is operable to be rotated about a shaft by the action of a float. As a fluid level in a tank changes, the cam rotates from an open position remote from the opening to a closed position (as illustrated) proximate the opening. A gap remains between the cam and the opening, thereby allowing the fluid level to be drawn down to the bottom of opening. Float has a generally wedge shaped cross-section to minimize the effect of wave action in the fluid.

18 Claims, 1 Drawing Sheet

1

VALVE FOR A TANK AND ESPECIALLY FOR A FLOW CONTROL ARRANGEMENT HAVING A PLURALITY OF FLUID STORAGE TANKS

BACKGROUND OF THE INVENTION

This invention relates generally to the field of flow control devices, and more particularly to a valve mechanism for a tank, and especially for a multiple tank arrangement having a flow control valve within each tank.

It is known to provide a plurality of fuel tanks on locomotive engines, with a fuel pump drawing fuel from each of the tanks simultaneously. In many applications, there is no flow control device used in the fuel line from the respective fuel tanks. In such an arrangement, when one of the tanks becomes empty, the fuel pump will draw air from that tank in lieu of fuel, thereby starving the engine of its necessary fuel supply. Once one tank becomes empty, cavitation in the fuel pump will prevent it from drawing the remaining fuel from the tanks that are not yet empty.

To overcome this problem, it is known to provide a flow control device such as an electronic solenoid valve within the fuel line from each respective tank. When a tank is nearly empty the respective fuel line solenoid valve may be closed prior to drawing air from that tank. However, such devices are complicated and relatively expensive, and have a probability of failure that is a function of the reliability of the separate fuel level measuring device and the electronic solenoid valve. Thus, there is a particular need for a fluid flow control arrangement for a plurality of fluid storage tanks that will permit a maximum amount of fuel to be drawn from the tanks and that is inexpensive to build and reliable to operate.

SUMMARY OF THE INVENTION

Thus there is a particular need for a fluid flow control arrangement having: a plurality of fluid storage tanks; a pump; a line connecting each of the tanks to the pump; an opening formed in each line within its respective tank for the passage of fluid from the tank into the line; a cam associated with each opening, each such cam being operable to be rotated from a first position remote from the respective opening to allow unrestricted flow of fluid through the opening to a second position proximate the opening to restrict the flow of fluid through the opening.

DETAILED DESCRIPTION OF THE INVENTION

Figure 1:
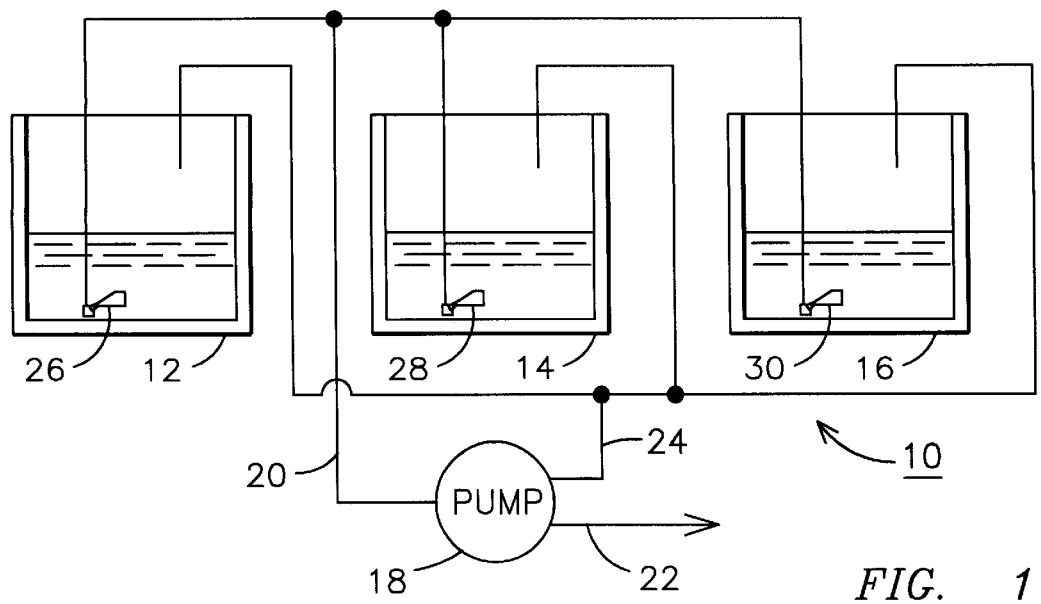
FIG. 1 is a schematic illustration of a multiple tank fuel system incorporating a fluid flow control valve arrangement.

FIG. 1 illustrates a fluid flow control arrangement having a plurality of fluid storage tanks 12, 14, 16 feeding a fluid such as diesel fuel, for example, to a pump 18. Pump 18 has an inlet line 20 connecting each of the tanks 12, 14, 16 to the pump 18. Pump 18 also has an outlet line 22 for providing the fluid, such as diesel fuel, for example, to an engine (not shown). A bypass line 24 is also provided at the outlet of the pump 18 in order to recycle fluid back to tanks 12, 14, 16 when the demand of the outlet line 22 is less than the pumping capacity of pump 18. Disposed in each of the tanks 12, 14, 16 is an opening in the respective ends of the inlet line 20, and an associated valve arrangement 26, 28, 30. During the operation of pump 18, fluid will pass from each of the tanks 12, 14, 16 into inlet line 20 for delivery to outlet line 22. When the fluid level in any of the tanks 12, 14, 16 reaches a predetermined low level, the respective valve 26, 28, 30 will operate to restrict the flow of fluid and air through a respective opening as pump 18 continues to draw fluid from the remaining tanks. Valve arrangement 26, 28, 30 includes both the fluid level sensing means and the fuel restriction means completely within the respective tanks 12, 14, 16 as discussed more completely with reference to FIGS. 2 and 3 below.

Figure 2:
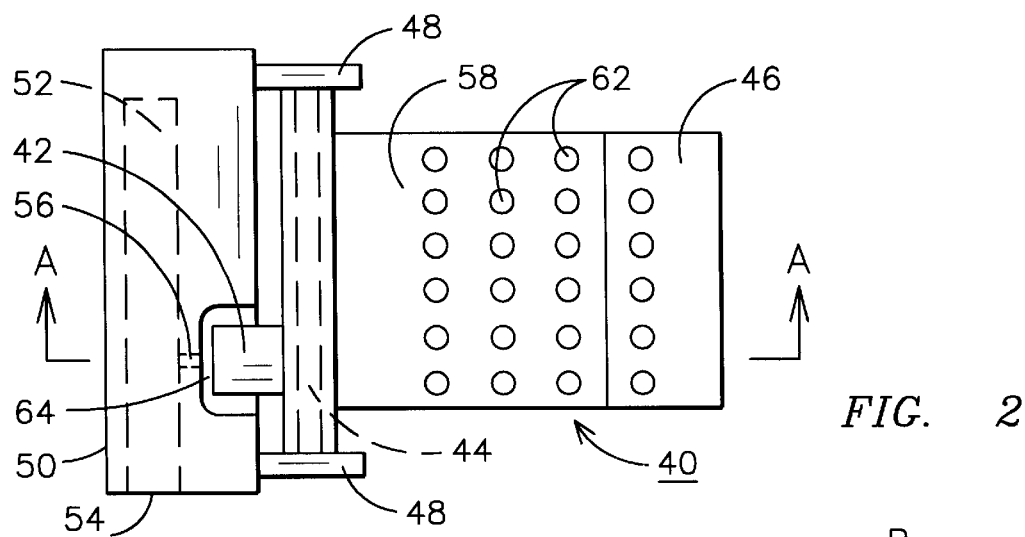
FIG. 2 is a top view of a valve.
Figure 3:
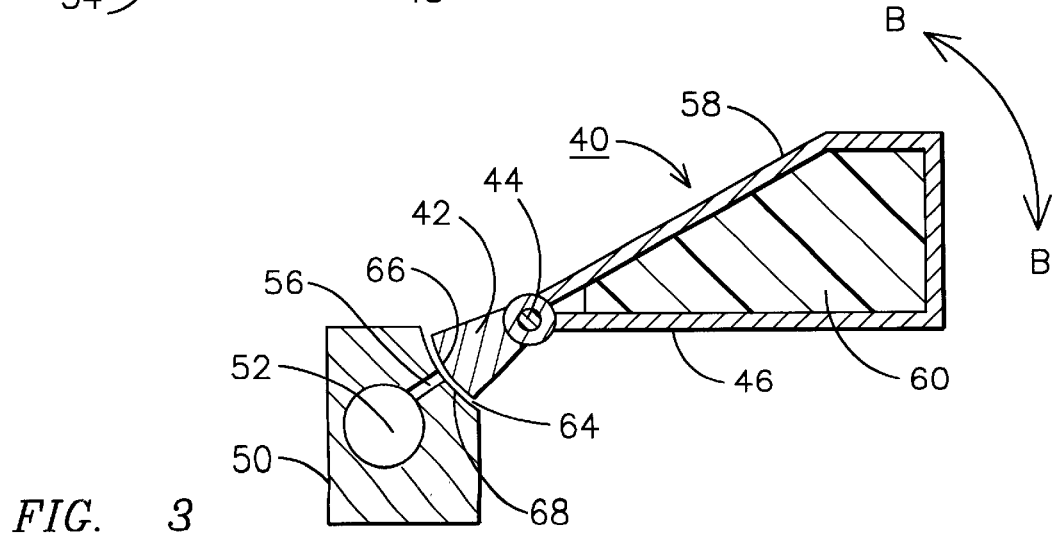
FIG. 3 is a cross-sectional view of the value of FIG. 2.

FIG. 2 illustrates a top view of a valve 40 as may be used in any one or more of the valve arrangements 26, 28 30 of FIG. 1. FIG. 3 illustrates a cross-sectional view of valve 40 as viewed along Section A—A of FIG. 2. As may be appreciated by viewing FIGS. 2 and 3 together, valve 40 includes a cam 42 operable to be rotated about shaft 44 by a float 46. Shaft 44 is attached by brackets 48 to a header 50. Header 50 includes an interior chamber 52, which may be connected at an end 54 to a fuel line (not shown) such as inlet line 20 in FIG. 1.

An opening 56 is also formed in header 50, connecting with chamber 52 to permit the flow of fluid contained within the tanks 12, 14, 16 into the chamber 52. As may be appreciated from FIG. 3, which is viewed along a horizontal plane, as float 46 is rotated in the direction of Line B—B by changes in the fluid level within the respective tank 12, 14, 16, cam 42 is rotated from a first position remote from the opening 56 (not shown) to a second position (as illustrated) proximate the opening 56, thereby restricting the flow of fluid through the opening 56.

Float 46 may be formed of any construction providing buoyancy in the fluid to be stored within the respective tank. In one embodiment, a stainless steel or other metal frame 58 is formed to encompass a buoyant insert 60. Insert 60 may be formed of rubber, wood, closed cell foam or plastic. A plurality of holes 62 may be formed in frame 58 in order to reduce the weight of the frame, thereby increasing the buoyancy of the float assembly 46. In some applications, such as in the fuel tank of a locomotive, it is important that the valve 40 be more likely to fail in an open position. For such applications, it may be desirable that the net buoyancy of the combination of the cam 42, shaft 44, and float 46 is positive in the fluid so that in the event of a mechanical failure of bracket 48, the cam 42 will be moved away from opening 56, thereby preserving the flow of fluid through opening 56.

As can be seen most clearly in FIG. 3, float 46 has a cross-sectional area in the plane of the surface of the fluid that is greater along a lower cross-section than along an upper cross-section. This wedge shape provides a more stable float level when there are waves in the surface in the fluid within the tank. Because the cross-sectional area in the plane of the surface of the fluid gradually decreases from a lower cross-section to an upper cross-section, the incremental buoyancy created when a wave passes across the float 58 is less than it otherwise would be with a float having a more rectangular or symmetric cross-section. The wedge shape of float 46 also reduces the weight of the un-wetted portion of the float in relation to the wetted portion, thereby allowing the float to generate the necessary buoyancy force in a reduced depth of fluid. This feature facilitates a design for valve assemblies 26, 28 30 that will permit the draining of the fluid to a lower level within tanks 12, 14, 16.

As illustrated in FIG. 3, with cam 42 in a position proximate to the opening 56, there remains a gap 64 between the sealing surface 66 of cam 42 and the sealing surface 68 of header 50. For an application of the fluid float control arrangement 10 in a locomotive, the diameter of generally circular opening 56 may be approximately one-half inch and the gap 64 no less than 0.003 inches. By insuring that the cam 42 is located no closer than 0.003 inches from the opening 56, there will continue to be a small flow of fluid through opening 56 even with the cam 42 in its closed position proximate the opening 56. The advantage of such an arrangement is that the fluid level in the respective tank will be drawn down to a level equal to the bottom of opening 56, thereby providing an additional quantity of fluid from the tank. Gap 64 should be maintained small enough so that the amount of air drawn through opening 56 with the cam in its closed position is small enough that it does not adversely affect the operation of pump 18 or any equipment located downstream of outlet pipe 22. To maintain gap 64 to a tight tolerance, it may be desirable to control the surface roughness of the sealing surfaces 66, 68 to no more than 200 micro inch and preferably to no more than about 63 micro inch.

It is known that a circular opening in a fuel supply line in a tank will generate a vortex within the fluid as the level of the fluid approaches the opening of the fuel line. Once such a vortex is formed, air will be introduced into the fuel line prior to the level of the fuel actually dropping to the level of the opening in the fuel line. Advantageously, the design of valve 40 precludes the formation of such a vortex by partially restricting the opening 56 as cam 42 moves from its open position remote from the opening 56 to its closed position proximate the opening 56. In particular, as the cam sealing surface 66 approaches the opening 56, it causes the flow area of the opening 56 to become non-circular, thereby preventing the formation of a vortex.

It is known that in multi-tank fluid systems having a valve on each respective tank suction line, that the amount of force needed to open a valve while the pump is operating may be large due to the suction force created by the pump. This problem may be overcome when using an electric solenoid valve by providing a solenoid having sufficient force to overcome the pump suction force. Advantageously, the design of valve 40 avoids the need for such a large opening force by providing gap 64, thereby preventing the formation of a significant pressure differential across opening 56. The elimination of such suction forces is important to the proper operation of a mechanically driven float valve such as valve 40.

The combination of features of the fluid flow control arrangement and associated valve illustrated in FIGS. 1–3 is to provide a simple, inexpensive, reliable system that will allow a maximum amount of fluid to be drained from each of the plurality of tanks. While the invention has been described with reference to a preferred embodiment, it will be understood by those skilled in the art that various changes may be made and equivalence may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appending claims.

What is claimed is:

1. A multi-tank fuel storage arrangement for a vehicle for complete emptying of the tanks, the arrangement comprising:

a plurality of separate fuel storage tanks adapted to be carried on a vehicle;

a fuel pump;

piping extending from the fuel pump to each fuel storage tank, with the piping for each tank terminating at a fuel inlet opening positioned adjacent to the bottom of the tank;

a valve at each fuel inlet opening, with each valve having a movable valve member mounted for movement between a first position, constituting an open position, unblocking the fuel inlet opening for flow of fuel from the tank to the pump when the level of the fuel in the tank is above a predetermined level and a second position, constituting a closed position, blocking substantially but not completely the flow of fuel from the tank to the pump when the level of the fuel in the tank is below a predetermined level, and a float for each tank for moving the respective movable valve member between its open and closed positions, whereby fuel may continue to be emptied from each of the tanks after the respective float has moved the respective valve member to its closed position through a gap defined between a pair of sealing surfaces of each respective valve until the fuel level is drawn down to a level equal to a bottom of the fuel inlet while limiting a flow of air through the gap to the pump to a value that would not adversely affect its operation.

2. The multi-tank fuel storage arrangement of claim 1, wherein each float is of generally wedge shape in section.

3. The arrangement of claim 2, wherein each float has a horizontal sectional area that is greater along a lower end than along an upper end of the float.

4. The arrangement of claim 1, wherein each valve further comprises a valve seat, and the movable valve member and seat provide an opening to fluid flow approximately 0.003 inches wide when the valve member is in its closed position.

5. The arrangement of claim 4, wherein both the sealing surfaces of the valve member and respective valve seat have a surface roughness of no more than 200 micro inch.

6. The arrangement of claim 1 wherein the movable valve member is mounted for pivoting movement between the first and second positions.

7. The arrangement of claim 1, further comprising a pivot member for each tank, with the respective movable valve member being attached to and rotatable about the pivot member.

8. The arrangement of claim 7 wherein the float is connected to the valve member and pivots the valve member about the pivot member as the level of fuel in the tank changes.

9. The arrangement of claim 8, wherein each float comprises a frame encompassing a buoyant insert.

10. The arrangement of claim 8 wherein the float is generally wedge shaped.

11. The arrangement of claim 1, wherein the net buoyancy of the combination of the float and the movable valve member is positive in the fluid so the moveable valve member will be moved away from the fuel inlet opening in the event of failure of a support arrangement for the moveable valve member.

12. The arrangement of claim 1, wherein the movable valve member is disposed to cause a flow area through the fuel inlet opening to become non-circular as the moveable valve member is moved toward the second position, thereby preventing the formation of a vortex in the fuel being drawn into the piping.

13. A fluid storage arrangement comprising:

a plurality of fluid storage vessels;

a pump;

piping connecting the pump to each vessel, the piping for each vessel terminating at an inlet opening positioned within the respective vessel;

a valve connected at each inlet opening, each valve moveable between an open position unblocking the inlet opening for full flow of fluid between the respective vessel and the pump and a closed position blocking substantially but riot completely the flow of fluid between the respective vessel and the pump;

wherein a gap is maintained between a pair of sealing surfaces of each valve for the flow of fluid through the respective valve when in the closed position so that fluid in the respective vessel may be drawn down to a level proximate a bottom of the respective inlet opening; and wherein each gap is maintained to be small enough so that an amount of air drawn through the gap when the fluid level in the respective vessel is fully drawn down below the inlet opening is small enough that it does not adversely affect the operation of the pump.

14. The fluid storage arrangement of claim 13, wherein each respective valve further comprises:

a cam disposed proximate the respective inlet opening and rotatable between an open position remote from the inlet opening and a closed position proximate the inlet opening, the respective gap existing between the inlet opening and the cam in the closed position;

a float connected to the cam for rotating the cam in response to a change in the level of the fluid in the respective vessel.

15. The fluid storage arrangement of claim 14, wherein each float is of generally wedge shape in section.

16. The fluid storage arrangement of claim 14, wherein the net buoyancy of the combination of the float and the cam is positive in the fluid.

17. The fluid storage arrangement of claim 14, wherein each float comprises a frame encompassing a buoyant insert.

18. The fluid storage arrangement of claim 13, wherein each inlet opening is circular, and wherein as the respective cam is rotated from the open position to the closed position, the restriction of the inlet opening caused by the cam results in a flow area for the fluid to become non-circular in section, thereby preventing the formation of a vortex in the fluid being drawn into the piping.

* * * * *